United States Patent
Schneider et al.

(10) Patent No.: US 9,589,448 B1
(45) Date of Patent: Mar. 7, 2017

(54) AUTONOMOUS SAFETY AND SECURITY DEVICE ON AN UNMANNED PLATFORM UNDER COMMAND AND CONTROL OF A CELLULAR PHONE

(71) Applicant: Micro Apps Group Inventions, LLC, Colchester, VT (US)

(72) Inventors: Mark Schneider, Williston, VT (US); Lee Bryan, Williston, VT (US); Patricia L. Scott, Westford, VT (US); Vladimir F. Kogan, Port Jefferson, NY (US); Wendy C. Scully, Colchester, VT (US); Jack T. Scully, Colchester, VT (US)

(73) Assignee: Micro Apps Group Inventions, LLC

( * ) Notice: Subject to any disclaimer, the term of this patent is extended or adjusted under 35 U.S.C. 154(b) by 0 days.

(21) Appl. No.: 14/962,492

(22) Filed: Dec. 8, 2015

(51) Int. Cl.
 *G08B 25/01* (2006.01)
 *H04W 4/22* (2009.01)
 *B64C 39/02* (2006.01)
 *F41H 9/10* (2006.01)

(52) U.S. Cl.
 CPC .......... *G08B 25/016* (2013.01); *B64C 39/024* (2013.01); *F41H 9/10* (2013.01); *H04W 4/22* (2013.01); *B64C 2201/066* (2013.01); *B64C 2201/126* (2013.01)

(58) Field of Classification Search
 CPC .......... G08B 25/016; H04W 4/22; F41H 9/10; B64C 39/024; B64C 2201/066; B64C 2201/126
 See application file for complete search history.

(56) References Cited

U.S. PATENT DOCUMENTS

| | | | |
|---|---|---|---|
| 4,982,645 A | 1/1991 | Abboud | |
| 6,239,700 B1 | 5/2001 | Hoffman et al. | |
| 6,624,754 B1 | 9/2003 | Hoffman et al. | |
| 7,581,702 B2 * | 9/2009 | Olson | H04W 4/046 244/189 |
| 8,149,124 B2 | 4/2012 | Hoffman et al. | |
| 8,466,795 B2 | 6/2013 | Hoffman et al. | |
| 8,472,915 B2 | 6/2013 | DiPerna et al. | |
| 2006/0238411 A1 * | 10/2006 | Fullerton | G01S 13/72 342/147 |
| 2007/0023582 A1 * | 2/2007 | Steele | B64C 39/024 244/190 |
| 2007/0293186 A1 | 12/2007 | Lehmann | |
| 2008/0064339 A1 | 3/2008 | Cavalier | |
| 2010/0224732 A1 * | 9/2010 | Olson | H04W 4/046 244/190 |
| 2010/0279649 A1 | 11/2010 | Thomas | |

(Continued)

FOREIGN PATENT DOCUMENTS

WO WO/2014/080387 5/2014

*Primary Examiner* — Rodney Butler
(74) *Attorney, Agent, or Firm* — H. Jay Spiegel

(57) ABSTRACT

A safety and security device is housed on either an unmanned aerial vehicle or its land-based docking station and is combined with a cellular telephone for self-defense purposes. The phone broadcasts both recorded audio and video warnings on the device. A flashing light may be activated on the aerial platform or the docking station. The device may be integrated into a modular unit that combines numerous defensive mechanisms. These defensive mechanisms operate autonomously and respond to perceived threats.

28 Claims, 14 Drawing Sheets

(56) References Cited

U.S. PATENT DOCUMENTS

| | | | |
|---|---|---|---|
| 2010/0283609 A1 | 11/2010 | Remer | |
| 2012/0019522 A1* | 1/2012 | Lawrence | F41G 3/02 |
| | | | 345/419 |
| 2012/0269633 A1* | 10/2012 | Danforth | F02K 9/00 |
| | | | 416/170 R |
| 2012/0299711 A1 | 11/2012 | Manning | |
| 2013/0040596 A1 | 2/2013 | Paim et al. | |
| 2013/0257612 A1 | 10/2013 | Finet | |
| 2013/0260825 A1 | 10/2013 | Hagenstad | |
| 2014/0254896 A1 | 9/2014 | Zhou et al. | |
| 2015/0134143 A1* | 5/2015 | Willenborg | G05D 1/0094 |
| | | | 701/2 |
| 2015/0148988 A1* | 5/2015 | Fleck | G05D 1/0011 |
| | | | 701/2 |
| 2015/0225081 A1* | 8/2015 | Stabler | B64C 39/024 |
| | | | 701/3 |
| 2015/0226530 A1* | 8/2015 | Batts | F41H 9/06 |
| | | | 102/334 |
| 2015/0362917 A1* | 12/2015 | Wang | G05D 1/0022 |
| | | | 701/2 |
| 2016/0021344 A1* | 1/2016 | Renkis | H04N 7/181 |
| | | | 348/48 |
| 2016/0068267 A1* | 3/2016 | Liu | B64C 39/024 |
| | | | 701/11 |
| 2016/0117853 A1* | 4/2016 | Zhong | H04N 5/2253 |
| | | | 345/634 |
| 2016/0129999 A1* | 5/2016 | Mays | B64C 39/024 |
| | | | 701/2 |
| 2016/0152345 A1* | 6/2016 | Molnar | B64C 39/024 |
| | | | 244/39 |
| 2016/0173740 A1* | 6/2016 | Corby | G06K 9/6267 |
| | | | 348/144 |

* cited by examiner

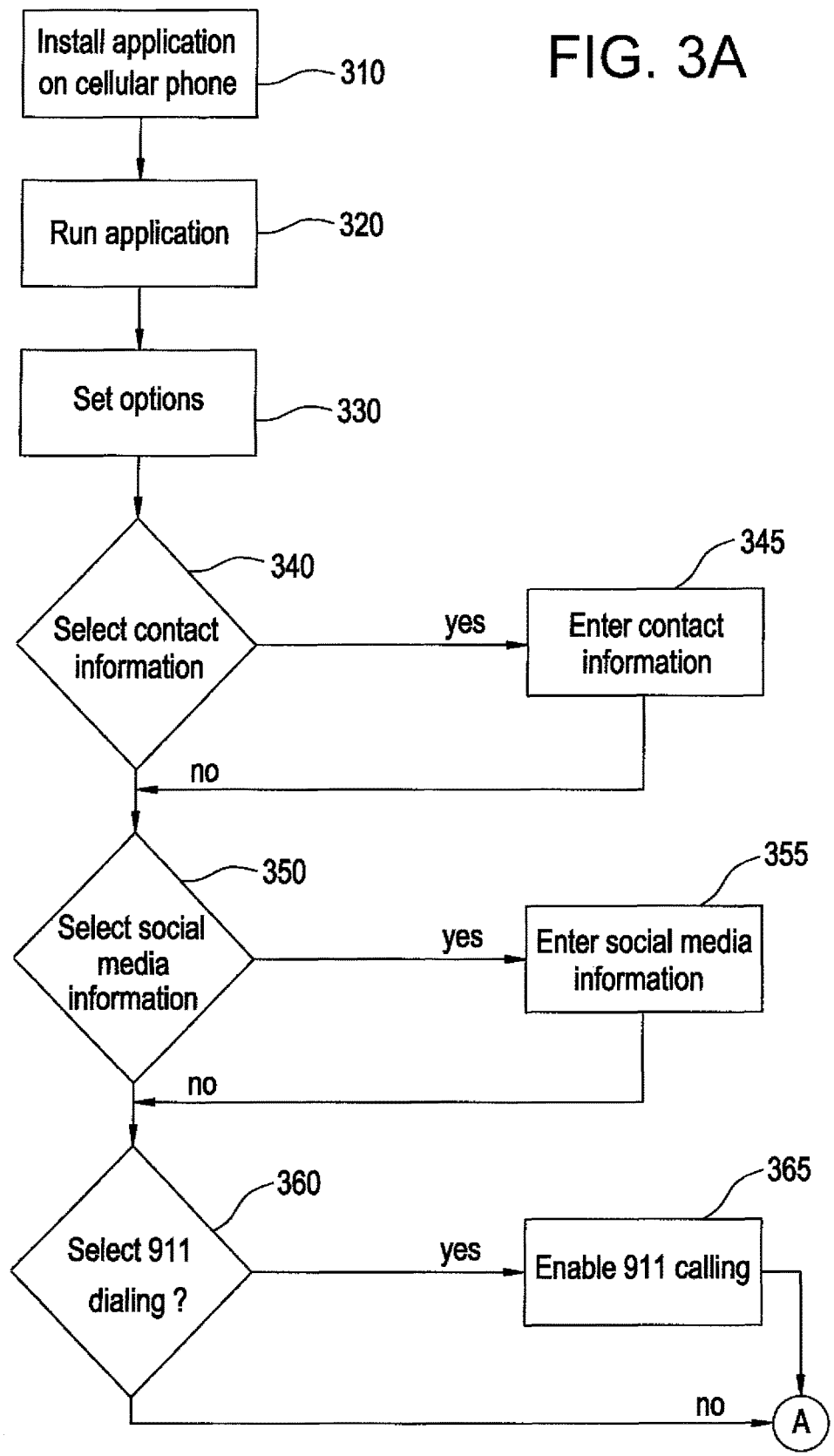

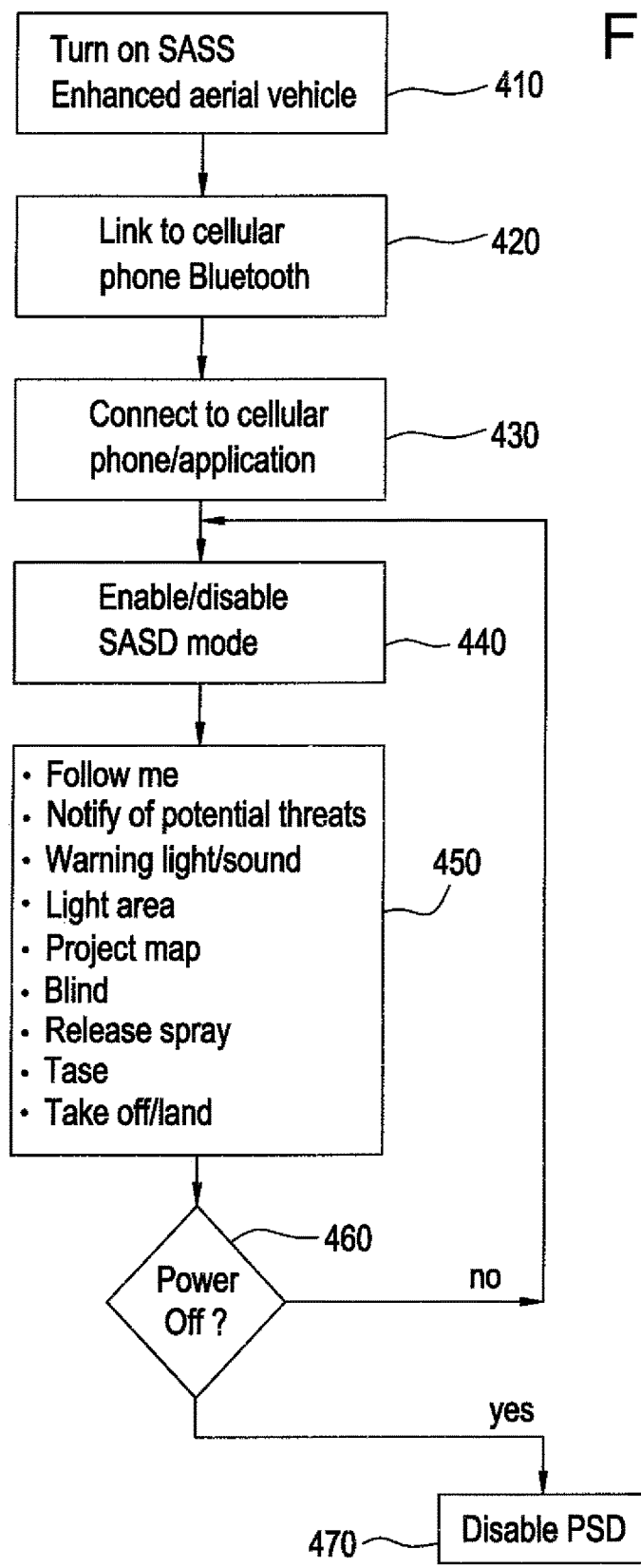

AUTONOMOUS SAFETY AND SECURITY DEVICE ON AN UNMANNED PLATFORM UNDER COMMAND AND CONTROL OF A CELLULAR PHONE

BACKGROUND OF THE INVENTION

The present invention relates to a modular safety and security device (SASD) controlled by a cellular phone that can be used in conjunction with an unmanned platform or its docking-station peripherals. In most instances, the unmanned platform will be an aerial vehicle (UAV) but it can, in fact, be any autonomous device.

Everyday, people are exposed to circumstances in which personal safety may be jeopardized: strolling on city sidewalks, hurrying to one's car at night, looking for one's car in a parking garage, jogging on an isolated road, walking the dog at night, getting lost outdoors, taking a short cut on a deserted road, getting waylaid by a vicious dog, hearing footsteps behind you, being stalked, waiting for help after a car breaks down, making a wrong turn in a dangerous neighborhood, or simply being alone or unprotected at home or in a building. Private property is similarly exposed to criminal acts ranging from thievery and vandalism to defacement and destruction—all of which exact a toll on one's sense of well-being. The frequency of crime in unexpected venues cannot be underestimated. Statistically 33% of women in the USA will be violently victimized at least once in their lifetimes. Another 8% will be stalked. The Justice Department counted 4.9 million violent crimes involving over 2.7 million victims in 2010. The FBI's Bureau of Justice Statistics reports that 3 million persons experienced at least one violent attack in 2013. The Justice Department estimates there were over 467,000 firearm victims in 2011. Kids Fighting Chance, a children's advocacy group, reports one child is abducted or reported missing every 40 minutes or 800,000 times per year. In addition, Safeguard the World, a home security company, estimates there are presently 2.5 million home intrusions a year in the USA, and that one-third of residential burglaries results in a personal assault. Thieves are rarely caught in the act; 13% of burglaries result in a conviction. While home security systems are a proven deterrent, only 17% of U.S. households use them.

According to criminal deterrence theory, an attack occurs after the criminal makes a risk-reward benefit analysis. He will act if the benefit outweighs expected consequence. Personal security statistics confirm this finding: criminals typically bypass an intended victim who raises attention or can identify them. Criminals also know the chances that the police will be in earshot during an attack are low.

Calls to the police are insufficient for deterrence. Most callers assume that law enforcement will respond before a criminal act occurs. Statistics indicate otherwise. Law enforcement rarely breaks up a street crime. The U.S. Justice Department estimates that just 12% of stalkers and 6% of rapists are caught in the act. More often than not, the police role is pursuit, investigation and witness for prosecution of the criminal act. For these reasons and more, people today need a personal security companion.

The present invention has particular usefulness in deterring damage, defacement, and destruction of public and private property. According to NoGraf Network, a national consortium of police agencies dedicated to ending vandalism, monitoring, detecting, removing and repairing graffiti damage is estimated to cost $15 billion to $18 billion a year. Similar disfigurement of watercraft, buildings, and machinery by avian droppings is a persistent problem annually costing tens of millions of dollars to clean up as well as posing significant health threats. While on-site cameras are often deployed in such locations to communicate incidents, their fields of view are limited and fixed. On the other hand, a UAV with appropriate defense mechanisms is capable of addressing the threat in real time while simultaneously streaming video of vandals and frequency/location of attacks to appropriate authorities.

The present invention is in the field of safety and threat deterrence and more particularly for personal and property protective devices that can be mounted and/or integrated on an unmanned aerial vehicle or its docking station peripherals, particularly as combined with cellular telephones, wearable computing, or other computing devices. Its particular functionality is achieved when a cellular phone is wirelessly connected to a suite of safety and security devices, mounted or integrated on an unmanned aerial vehicle (UAV) or onto its docking station. No matter where housed, the envisioned device provides wireless detection, warnings, notifications, alarms, and self-defense mechanisms to deter crime, vandalism and/or defacement of property by humans or wildlife.

The prior art known to Applicants takes advantage of the latest technology made available by battery-powered cellular phones. This includes telephony, the ability to capture pictures, videos and audio, Global Positioning System (GPS) location capabilities, and the ability to run software applications on built-in processing units. Some prior art inventions disclose holders, attachments and cases for cellular phones that allow additional personal safety devices to be physically linked to the cellular phone. This makes the combined device bulkier, heavier and less useful as a cellular phone. Some of them provide for personal safety device activation once a panic button is pushed, but the integration is incomplete. Other disclosures include voice-activated panic buttons but, as is well known, human voice under stress cannot always be understood, even by voice recognition software.

U.S. Published Patent Application 2008/0064339, Mar. 13, 2008, to Cavalier, describes a personal safety device formed by combining a modified cellular telephone with a personal protective spray, such as pepper spray. Activation of the spray causes the cellular telephone to automatically alert emergency response personnel and provides them with cellular phone location via GPS in the phone. It requires modification of the cellular phone and does not work in conjunction with other personal safety devices over a local network or in conjunction with an UAV.

U.S. Pat. No. 8,472,915, Jun. 25, 2013, to DiPerna et al., also describes a cellular phone with personal protective spray and a panic button. When the button is activated, the personal protective spray is released and the phone records audio and/or video for transmission, transmits the data to emergency response personnel, and provides them with cellular phone location via GPS in the phone. It requires attaching devices to the phone or modification of the cellular phone and does not work in conjunction with other personal safety devices over a local network or in conjunction with an UAV.

U.S. Published Patent Application 2007/0293186, Dec. 20, 2007, to Lehmann, describes a portable device that includes the ability to biometrically identify the user. The portable device can be a cellular phone with integrated cameras, sound recorders, and/or biometric authentication mechanisms and utilizes GPS to determine geographic location. Data communication in the form of GPS location data, messages, videos, pictures, etc. can be performed over many types of networks including local area networks (LANs). LANs however, are not meant for personal area network use. Lehmann's invention does not work in conjunction with other personal safety devices over a personal area network or in conjunction with an UAV.

U.S. Published Patent Application 2010/0283609, Nov. 11, 2010, to Remer, describes a personal safety system that provides image, audio, and data capture of a perpetrator of a crime against the user. Data is stored at a secure remote location. The device alerts the perpetrator that the information has been captured, thus discouraging the crime. Remer's invention does not work in conjunction with other personal safety devices over a personal area network or in conjunction with an UAV.

U.S. Published Patent Application 2012/0299711, Nov. 29, 2012, to Manning, describes a personal safety and alarm system including a siren/strobe light, and a pepper spray container in a holder. The holder can be detached. The holder can reside on a stand or be placed in a pocket. Manning's invention does not work in conjunction with other personal safety devices over a personal area network or in conjunction with an UAV.

U.S. Published Patent Application 2013/0040596, Feb. 14, 2013, to Paim et al., describes a method that allows a smartphone user to easily and properly share his status during distress situations with people who can better help him contextually and reliably. The Paim et al. invention, while utilizing many network methods, does not work in conjunction with other personal safety devices over a personal area network or in conjunction with an UAV.

U.S. Published Patent Application 2013/0257612, Oct. 3, 2013, to Finet, describes a personal alert/safety system worn by a user. An accelerometer in the system detects movement and controls an alarm device. The Finet invention does not use a cellular device and does not work in conjunction with other personal safety devices over a personal area network or in conjunction with an UAV.

U.S. Published Patent Application 2013/0260825, Oct. 3, 2013, to Hagenstad, describes many of the previously described components. The cellular phone has a panic button that can activate audio and video recording, start a siren, flash lights and contact emergency personnel with GPS location data. These capabilities can also be deployed in an attachable cellular phone case. The Hagenstad invention does not work in conjunction with other personal safety devices over a personal area network or in conjunction with an UAV.

U.S. Pat. No. 4,982,645, Jan. 8, 1991, to Abboud, describes a stun gun and irritant ejecting spray combination. The Abboud invention does not work over a personal area network or in conjunction with an UAV.

U.S. Pat. No. 8,466,795, Jun. 18, 2013, U.S. Pat. No. 8,149,124, Apr. 3, 2012, U.S. Pat. No. 6,624,754, Sep. 23, 2003 and U.S. Pat. No. 6,239,700, May 29, 2001 to Hoffman et al., describe a signaling system that provides an alarm for an individual in distress, combined with a locating and tracking system, possibly by cellular phone, to alert and direct appropriate personnel to the needs of the individual in distress and to monitor the location of that individual. The system includes a portable signaling unit, a remote alarm switch device, a central dispatch station, and makes use of a wireless communication system. The portable signaling unit and the remote alarm switch may be adapted to be worn at different locations on the person's body. The remote alarm switch may be concealed in the form of a wristband or in the form of any other object such as a broach, pendant, or keychain. Even though a wireless remote is described that is separate from the cellular phone, nowhere is it mentioned that the wireless remote contains other personal safety devices nor do these devices work over a personal area network or in conjunction with an UAV.

U.S. Published Patent Application 2014/0254896 discloses a system and method for delivering mail and goods using a mobile robot UAV system. The method may comprise self-moving the mobile robot drone system to a mail or goods receiving location. The robot may offer security for the delivered goods. It does not provide personal security or property protection.

Published Application No. WO2014080387 discloses a rescue UAV for rescuing an idle UAV consisting of an adjustable length hook to engage with the idle UAV, to carry it away, an L-shaped metallic tool to push the idle drone away from the middle of the road, or to help in repositioning it so a hook can be engaged, along with an emergency light to assist while hovering over the idle UAV located in a road, an electric shock stick, deployable against a person approaching the idle UAV with intent to steal it, a speaker and camera to assist a security person in a command center to assess the case, talk with and warn any person with intent to steal the idle UAV, or to advise and guide a volunteer who is trying to help and assist in rescuing the idle UAV. It does not provide personal security or property protection.

U.S. Published Patent Application 2010/0279649 discloses multiple devices combined together and connected by a cellular phone for security and law enforcement purposes. It does not describe an UAV-based personal safety device.

SUMMARY OF THE INVENTION

The present invention relates to a modular, expandable safety and security device mounted or integrated on an UAV, pre-programmed to autonomously follow, hover or circle, indoors or outdoors, above its user, and able to provide local area surveillance and security when the same device is tethered to its docking station. Additionally, the present invention provides a means to provide both indoor and outdoor premises security and protection. In these respects, the combination cellular phone and safety/security device, integrated with an unmanned aerial vehicle, according to the present invention, substantially departs from the conventional concepts and designs of the prior art, and in so doing provides a single apparatus primarily developed for the purpose of providing a means of communication and control for a self-defense system integrated with an UAV platform or its docking mechanism.

The present invention includes the following interrelated objects, aspects and features:

(1) In a first aspect, the present invention contemplates a safety and security device (SASD), capable of operation from above or within a structure, which is self-contained and, when activated, communicates with a cellular telephone to also provide self-defense capability. A dedicated communication device may also be used in place of the cell phone.

(2) In the preferred embodiment, the SASD integrated with an UAV or its docking station includes any or all of the following: an alarm and visual warning instrument, a shocking mechanism, and a sprayer designed to squirt a substance for self-defense purposes, such as pepper spray or tear gas, and a light for illumination of the area or blinding an assailant. It may also include, where allowable by law, one or more destructive means of disabling an assailant such as an energy release weapon or a projectile that can be fired. It may further include a means to communicate directly with emergency responders as well as autonomously providing live streaming video for deterrence purposes. When sitting in its docking station, it may also provide a wireless, indoor premises monitoring system without the necessity of hard mounting sensors on perimeter doors, walls, and windows. It may also leave its docking station to provide reconnaissance. In addition to its video, audio, flashing and alarm capability, it may also be augmented or communicate with motion detection, glass breakage, and similar devices, well known by purveyors of home security systems. Outdoor premises monitoring, using cameras and other sensors, can also provide reconnaissance and deterrence by being visibly present and buzzing/frightening away criminals, mischief makers and nuisance wildlife. There may be multiple stand-alone or networked UAVs deployed with safety and security devices.

(3) In order to operate the present invention, the personal safety device software application, which includes command, control and communication with the aerial platform, is downloaded into a user's cellular telephone (cell phone) or similar wearable or portable computing device. It should be understood, moreover, that, for premises monitoring, a PC, table or similar computing device can also be used. Among other things, a variety of user settable software options may be selected such as: contact information for the user, social media contact information, enabling 911 emergency calling, as well as existing and emerging cellular phone apps for drones, such as auto takeoff and landing, activation of automatic "follow-me" with obstacle sensing and avoidance controls, real-time two-way video communications, solar charging batteries, and other useful functions rapidly becoming available in the burgeoning UAV marketplace.

(4) In another aspect, the software provides the capability of activating a separation alarm. Thus, if the cell phone and the aerial or docked safety/security drone are separated by a preset distance, and/or for a pre-set time, an alarm can be triggered allowing the user or a third party site, such as a police station, to be alerted.

(5) The SASD, whether on an unmanned aerial vehicle or at its docking station may also be provided with an autonomous panic switch that, when activated, notifies the cell phone via a radio link, Bluetooth or other communication methods as may become available. Optical recognition software, home security sensors, a separation alarm, and similar devices, can all be used to trigger this switch.

(6) The system may include means for monitoring various capabilities such as, for example, checking of the level of the spraying substance as well as the level of charge of the SASD battery, which impacts the amount of voltage that may be applied by the shocking mechanism, and, in general, monitoring the health/state of the UAV power source. Additionally, the user can monitor the strength of signal between the UAV/SASD and the associated cell phone to make sure that signals sent by the UAV/SASD may be effectively received by the cell phone and that, as required, the UAV does not stray beyond prescribed limits. This monitoring of signal strength may also be used to keep the UAV within a prescribed offset from the cell phone to enable autonomous "follow me" capabilities. A built in altitude flight limit can also be incorporated to prevent the UAV from flying above approved FAA limits.

(7) In another aspect, the present invention contemplates an optical camera on the UAV or at its docking station that is self-contained but, when activated, communicates with a cellular telephone while also providing assailant detection capabilities. The optical capabilities can be used with the "follow me" capability to enable autonomous overhead tracking of the drone's user and to help differentiate between the user and an assailant. After identifying a potential assailant(s), the system can notify the user of a threatening approach, before an attack occurs, and activate self-defense mechanisms.

(8) In another aspect, the present invention provides premises security. Indoors it can navigate a route, checking for intruders, broken windows and doors that are ajar. It can also monitor an area from a fixed home base. Outdoors it can secure the perimeter of a property, check for vandals or uninvited guests. It can also be used as a "scarecrow" to scare birds or wild animals from a property, such as a car, boat or home. It may also be tethered to the property such that a supply of constant power and a wired communication link are available (9) Through use of the present invention, a user may feel secure: 1) while being autonomously followed by the envisioned device contained on/in an UAV or while being monitored within a building. Such a device cannot only provide audio/visual warnings and alarms, but also self-help by disabling an assailant through shocking, spraying or firing mechanisms. These functions are controllable by two-way communication with a user's cell phone in such a way that permit authorities to quickly locate a crime victim, protect him from further harm while simultaneously aiding police apprehension through steaming video, audio, and still images of the assailant's likeness; 2) while his premises is autonomously monitored. Such a device can provide audio/visual warnings and alarms based on optical observations and querying of sensors. Intruders can be disabled through shocking, spraying or firing mechanisms. These functions are controllable by two-way communication with a user's cell phone in such a way so as to permit authorities to quickly locate a crime victim, protect him from further harm while simultaneously aiding police apprehension through steaming video, audio, and still images of the assailant's likeness and; 3) while assured that his premises are protected from human and non-human vandals known to deface personal property. Such a device can provide audio/visual surveillance based on optical observations. Vandals can be disabled through shocking, spraying or firing mechanisms or chased from the premises. They can also be instructed to leave before such defensive actions are undertaken. These functions are controllable by two-way communication with a user's cell phone in such a way that aids police apprehension of the vandals through streaming video, audio, and still images, or by simply chasing intruders away before property damage occurs.

As such, it is a first object of the present invention to provide a safety and security enhanced unmanned aerial vehicle (UAV).

It is a further object of the present invention to provide such a device that can be activated within a building while hovering/circling in an aerial security mode or while residing in its stationary docking/inductive recharging station.

It is a further object of the present invention to provide such a device that can be activated outside a building in an aerial security mode or while in its stationary docking/inductive recharging station.

It is a further object of the present invention to provide such a device that wirelessly communicates with a cell phone to enable transmission of information concerning an attack to authorities and social media.

It is a further object of the present invention to provide such a system in which the SASD may be equipped with offensive weapons such as a shocking mechanism, a method of blinding, a spraying apparatus designed to spray a noxious spray onto an assailant or a projectile firing or energy releasing mechanism designed to deter or disable an assailant.

It is a further object of the present invention to provide such a system in which the SASD device may detect a potential attack or intrusion before it occurs and alert the user.

It is a further object of the present invention to provide such a device that may include a panic switch for activating notification.

It is a yet further object of the present invention to provide such a device in which a sensor can sense the spacing between an aerial personal safety drone and an associated cell phone and trigger remote notification when the spacing exceeds a pre-set distance or time between the device and cell phone.

It is a still further object of the present invention to provide a wireless optical camera that mounts on the UAV or in its docking station.

It is a yet further object of the present invention to provide an aerial or docked camera that is self-contained but, when activated, communicates with a cellular telephone while also providing assailant detection capabilities.

It is a yet further object of the present invention to provide a means of protecting the outside of a premises, including deterring nuisance wildlife or vandals from defacing, damaging or destroying public and private property, including, but not limited to, watercraft, docks, statues, buildings, walls, overpasses, transportation vehicles and other valued sites, etc. In such instances, the device can be installed on an unobtrusive, convenient platform on the property to be protected. When audio, video, or movement detects a threat to said property, the SASD equipped UAV can inform the user so that the user can take appropriate defensive steps, or the UAV can automatically launch and deploy one or more defensive measures to deter the threat, scare off wildlife, and, where appropriate, identify the perpetrator while communicating its activation and purpose to a cellular telephone before returning to its docking station.

These and other objects, aspects and features of the present invention will be better understood from the following detailed description of the preferred embodiment when read in conjunction with the appended drawing figures.

BRIEF DESCRIPTION OF THE DRAWINGS

FIGS. 3A and 3B combine together at the circled "A" s to comprise a flowchart of the application installer software on the cellular phone.

FIG. 4 is a flowchart of the optical software running on the Safety and Security Device (SASD).

SPECIFIC DESCRIPTION OF THE PREFERRED EMBODIMENT

Figure 1:
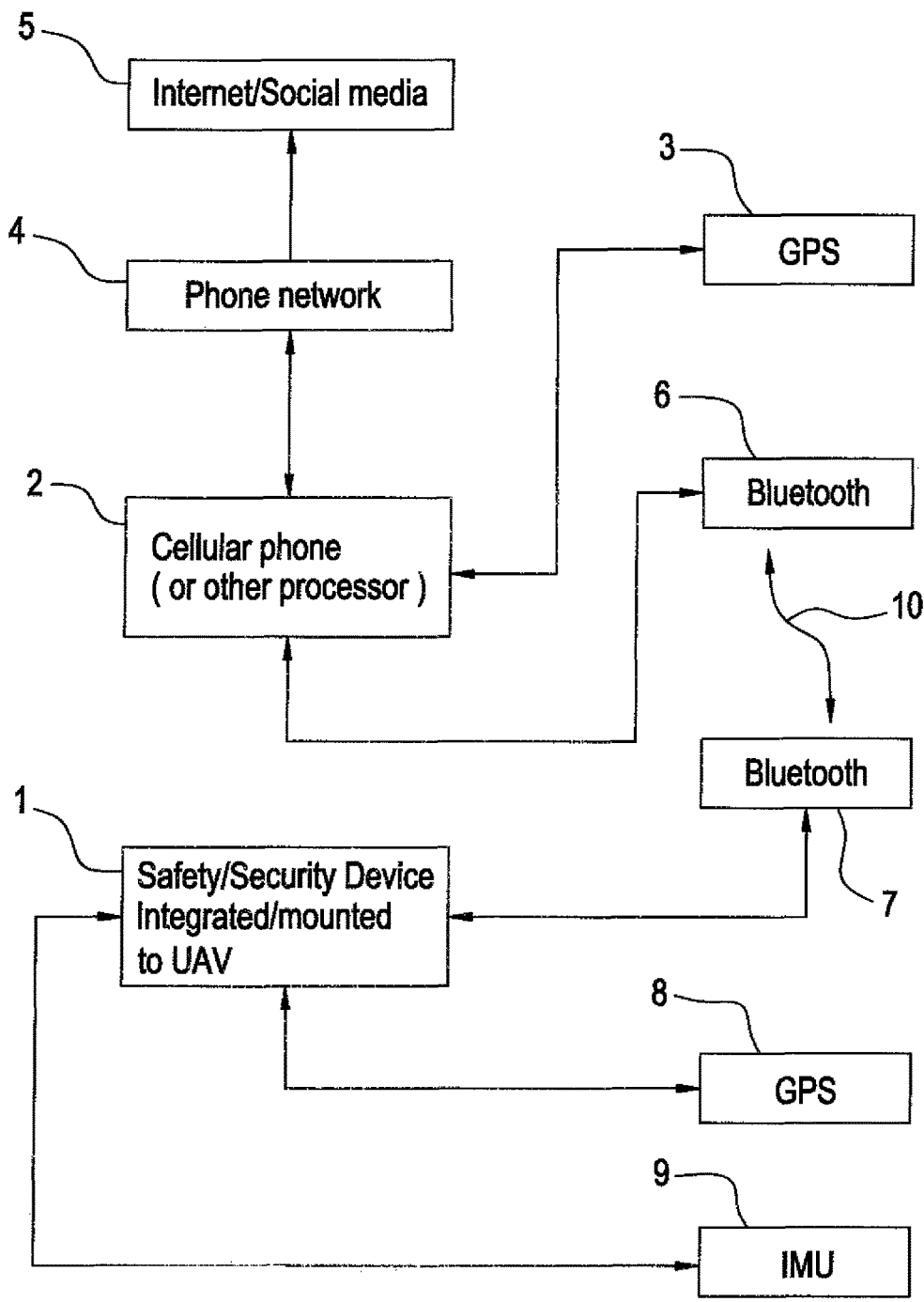
FIG. 1 is a schematic of the main components associated with the Safety and Security System (SASS). It consists of a Safety and Security Device (SASD) mounted or integrated into an unmanned aerial vehicle, capable of following a user and capable of sensing, identifying, and deterring an intruder inside or outside of a building.
Figure 11:
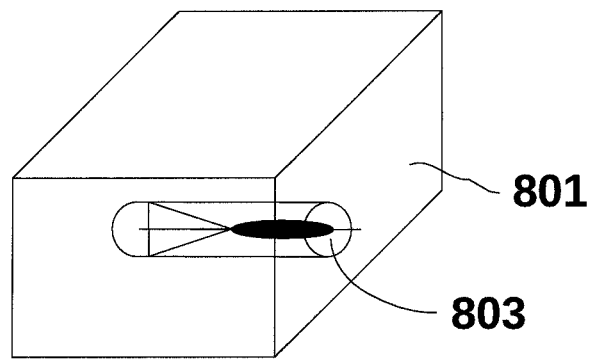
FIG. 11 shows a projectile that can be fired from the housing.
Figure 12:
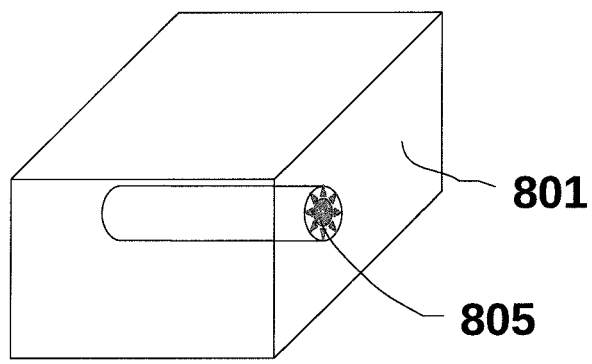
FIG. 12 shows an energy device for emitting energy from the housing.

FIG. 1 represents the main components of the deployable Safety and Security System (SASS) invention. The safety and security device (SASD) 1 is typically contained in a housing 801 (FIG. 10) and mounted on or integrated with a powered, unmanned aerial vehicle (UAV) 800 with energy for operations stored in a battery (220) and containing self-defense mechanisms, such as a shocking mechanism (140) and a spray mechanism (110) and/or other disabling weaponry to subdue or discourage a would-be attacker such as a projectile dart 803 (FIG. 11) or an energy device 805 (FIG. 12), a camera (295) and a light (120). The UAV and mounted or integrated safety and security device (SASD) 1 also contains a camera component used to identify and track potential assailants approaching from any direction within its field of view. It can further be used as part of the "follow me" function. Also, as is known in the art, GPS 8 and IMU 9 are usually available to the UAV. Other sensors for guidance, identification and deterrence can be incorporated.

The SASD 1 is "tethered" to either a cellular phone 2 via Bluetooth link 6 and 7 through RF link 10 and GPS 3 that provides location information of the whereabouts of the cellular phone, and therefore presumably of the cellular phone owner, sometimes aided by location information obtained by triangulation involving cellular phone towers. U.S. Pat. No. 5,515,419 discloses this aspect. The cellular phone 2 communicates over a cellular phone network 4 to provide interconnectedness to the phone network and the Internet 5. The phone network 4 allows the user to summon help over the phone network (calling 911 or calling another person directly). The Internet 5 also has linkages to various social media for summoning help over social media, such as, for example, Facebook. The SASD can be replicated multiple times, allowing for a fleet of SASD-based UAVs.

Figure 2:
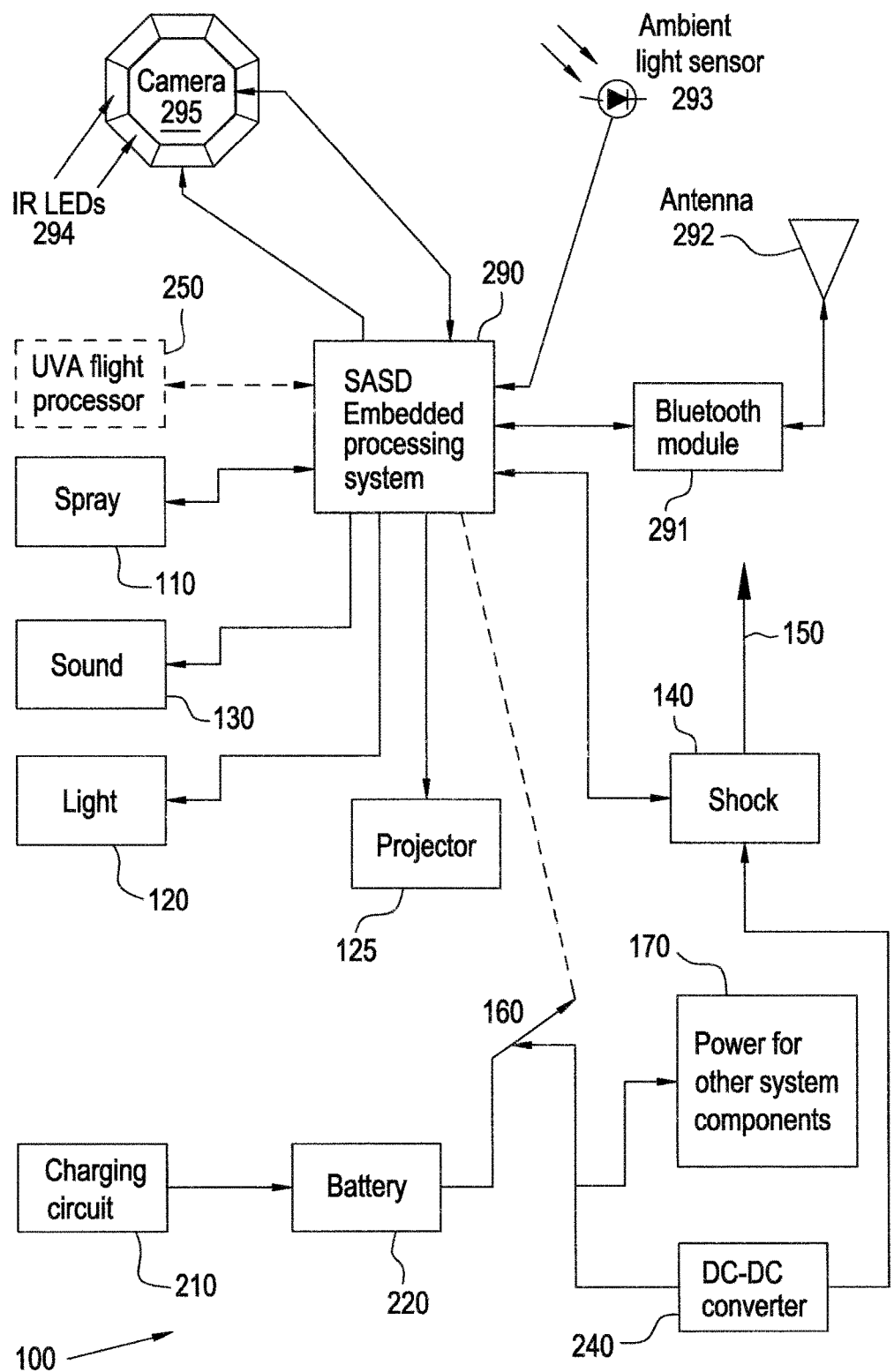
FIG. 2 is a schematic of the deployable Safety and Security Device of the present invention.

Referring now to the invention in more detail, in FIG. 2 there is shown a block diagram of the deployable SASD 100. An embedded processing system 290, such as a processor, memory and software, controls the workings of the SASD 100. The embedded processing system 290 communicates with the cell phone 2 via Bluetooth 291 and its antenna 292. The antenna 292 facilitates transmission of wireless signals from the SASD to a cellular telephone. Other devices, such as gate arrays, etc., as known in the art, could also be used for SASD control. Processing system 290 may also connect to the UAV flight processor 250 or be part of it. Communication may be wired or wireless between block 290 and the UAV flight processor. The UAV flight processor 250 controls the UAV. Examples of drone control can be found among the documentation of many drone manufacturers, for example Parrot (http://ardrone2.parrot.com/). The flight processor may contain GPS and IMU devices to allow for autonomous flight, as is known in the art. The IMU, using an incorporated barometric pressure capability, can be used to implement a flight altitude limiter.

The SASD 100 contains a self-defense mechanism comprising a pepper spray package 110 or other equivalent noxious spray/sprayer that can be attached to the SASD 100. Off the shelf, pre-packaged units of spray 110 are available commercially. Alternatively, a custom version of the contained spray may be employed that integrates specifically with the SASD. Block 130 shows a power on/off switch and can be either a mechanical or software based switch and is enabled by the SASD's digital data link or Bluetooth functionality. Block 140 is an electric shock device, such as a stun gun or taser, with electrodes 150. A description of a stun gun is disclosed in U.S. Pat. No. 4,688,140, incorporated herein by reference. Alternatively, where allowable by law, a more lethal defense mechanism such as a projectile 803 (FIG. 11) or an energy device (FIG. 12) may be deployed and activated.

Block 210 is a charging circuit that allows the SASD 100 battery 220 to be charged for use. The input to this charging circuit can be, for example, from a wall-mounted transformer, USB cable or inductive charging pad. It may also be solar charged, depending on the application. Solar charging, for instance, would be more useful when the SASD/UAV is used outdoors. Which input is used depends on the design of charging circuit 210 and, as known in the art, this can take on numerous forms, e.g., AC-DC converter using a direct or transformer coupled AC input, DC regulation using an unregulated DC input, etc. Battery 220 is a rechargeable type battery, preferably using lead-acid, nickel cadmium (NiCd), nickel metal hydride (NiMH), lithium ion (Li-ion), and lithium ion polymer (Li-ion polymer) technology, as is known in the art. Battery 220 can also be a non-chargeable type, eliminating the need for charging circuit 210. Whichever battery is used, it must be sized appropriately. It is also possible to split the battery: one specifically for powering the aerial platform and another for the SASD. Battery 220 is used to power the SASD via block 170 and the AC-DC converter 240 that converts the low battery voltage to a high voltage potential across electrodes 150 for shocking.

With further reference to FIG. 2, the camera 295 is a standard or infrared (IR) camera, where the IR camera is useful for viewing in darkness with IR light. For nighttime use, IR LEDs 294 provide IR light. This light is invisible to humans, thereby also concealing the fact that the aerial device is active. While color cameras can be used, the IR and monochrome camera provide less data to process, simplifying the detection of an assailant from any direction within the camera's field of view. The camera information can also be used for assisting in autonomous aerial device flight and for docking on a inductive charging pad. Ambient light sensor 293 is a semiconductor device that senses the ambient light level. This information is incorporated in the camera interface/logic module 292 to control the intensity of the IR LEDs 294. When daylight is sensed, the IR LEDs 294 are turned off. As the ambient light decreases, the IR LEDs 294 are slowly turned up in intensity so that the IR camera 295 always has adequate light for camera use. Image data from the camera 295 is suitably processed by interface 292 where it can be used for assailant determination, navigation, or can be sent to a digital data link or Bluetooth module 291, where it is transmitted to the cellular phone 2 for further image processing and analysis. As shown by the arrows, information from the cellular phone 2 can also provide some control over the camera 295 such as camera update rate, aperture, etc. As noted, the camera data can also be combined with inertial and GPS data to assist in autonomous flight control.

Block 120 is a light that can be used to illuminate an area below the UAV. It can be turned on and off via the cellular phone or adjusted based on light sensor 293. It can be used to illuminate the user or light the way slightly ahead of the user. It can also be used to illuminate a possible assailant or to flash as a warning signal. Finally, if comprised of multiple lights or variable intensity, the light could be used as a flash, blinding the assailant and providing time for the user to escape. Block 130 is a speaker or other such sound generator capable of being turned on via the embedded processing system. It can provide a warning sound to a possible assailant, or a prerecorded message, such as a warning that the authorities have been contacted.

Block 125 is a projector that can be used to project a map or direction onto the ground to assist in fleeing an area. Small projectors are readily available, such as the Cellulon PicoPro. Map data capabilities can be part of the UAV software, accessing the GPS form the flight processor 250 or obtaining map directions from the cellular phone over the Bluetooth interface, blocks 6, 7 and 10.

Figure 3B:
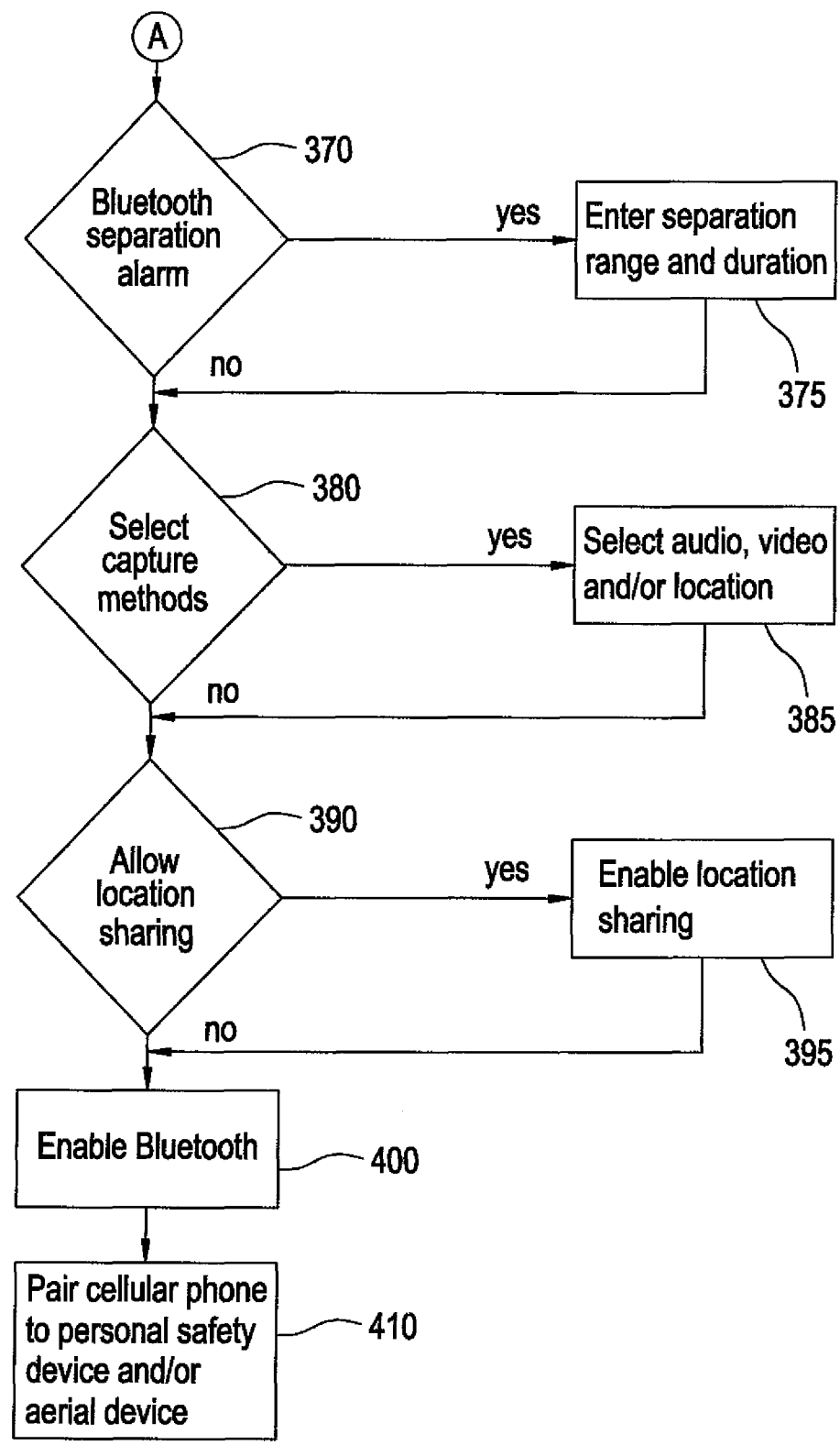

Referring now to the invention in more detail, FIG. 3 consists of FIGS. 3A and 3B combined together at the circled "A" s. Therein is shown a flowchart of the software installer used to install the SASS application onto the cellular phone for use as a personal safety/security device. Block 310 represents the user installing the application on the cellular phone. As is known in the art, this is accomplished by downloading the application from one of the various vendors' software repositories, such as the Apple store or Google Play. Once the application is installed, the user runs the application in Block 320. The user is then prompted to set various features and options that control how the cellular phone connects with other users of the network and how the cellular phone interacts with the SASD, as denoted by Block 330 and UAV's command, control and communication module. Various options are now selected. In Block 340, the user is asked if he would like to enter/add contact information. Such information can be a phone number, cellular and/or landline, an address, either physical and/or e-mail, etc. If the answer is yes, the user enters the desired data in Block 345. In Block 350, the user is next asked if he would like to enter social media contact information. Such information can be links for posting to Facebook, Twitter, and other social media sharing sites. If the answer is yes, the user enters the desired data in Block 355. In Block 360, the user is asked if he would like to add 911 emergency calling. If the answer is yes, the information is saved in Block 365.

In Block 370, the user is asked whether to enable the separation sensor and alarm. This alarm is triggered when the deployed SASD and the cellular phone are separated by a certain distance. This distance is based on the received signal strength indicator (RSSI) indicator. There is no standardized relationship between range and the RSSI reading, so this can only be used as an approximate distance measure, but it is sufficient. If enabled, the approximate distance is entered in Block 375. Additionally, related timing information can be entered, such as how long the devices are separated before enabling the alarm, giving the owner time to bring the deployed SASD and cellular phone together again. In Block 380, the user is asked what capture methods should be enabled to capture audio, video and location information. If selected, the user enters or checks the various methods. Block 390 asks the user whether location sharing should be enabled. Location sharing is a feature that allows you to let people know your position. Both Wi-Fi positioning system and GPS are used to pinpoint the user's location as accurately as possible. If desired, it is then enabled in Block 395. Block 400 is then reached where the digital data link and Bluetooth interconnection are enabled in the cellular phone. Once enabled, the user is asked to turn on the SASD and/or the UAV so that the cellular phone can be paired to the appropriate devices in Block 410. This is a standard method of using digital data links and Bluetooth interconnection, as is known in the art.

Referring now to the invention in more detail, in FIG. 4 there is shown a flowchart of the software running on the deployed SASD enhanced UAV. It is also possible that the SASD is always "on", listening for commands. In that case, main power is enabled via the digital data link and processor 290 to control switch 160. In Block 410, the user turns on the SASD using an embedded power switch 160, the digital data link or Bluetooth interconnection switch on his cellular phone 130 (FIG. 2). Once the SASD is on, the data link or Bluetooth links are enabled in Block 420 and the SASD connects to the cellular phone in Block 430. Block 440 is where the user selects the various modes for the SASD. Various scenarios can be set based on the selection of the various features turned on/off in block 450. Some of these are more UAV related while others are more SASD related. The SASD stays in this state of usefulness by monitoring in block 460 whether the system is turned off. The system continues to stay enabled with choices available for selection or de-selection until powered off and disabled in Block 470.

Figure 5:
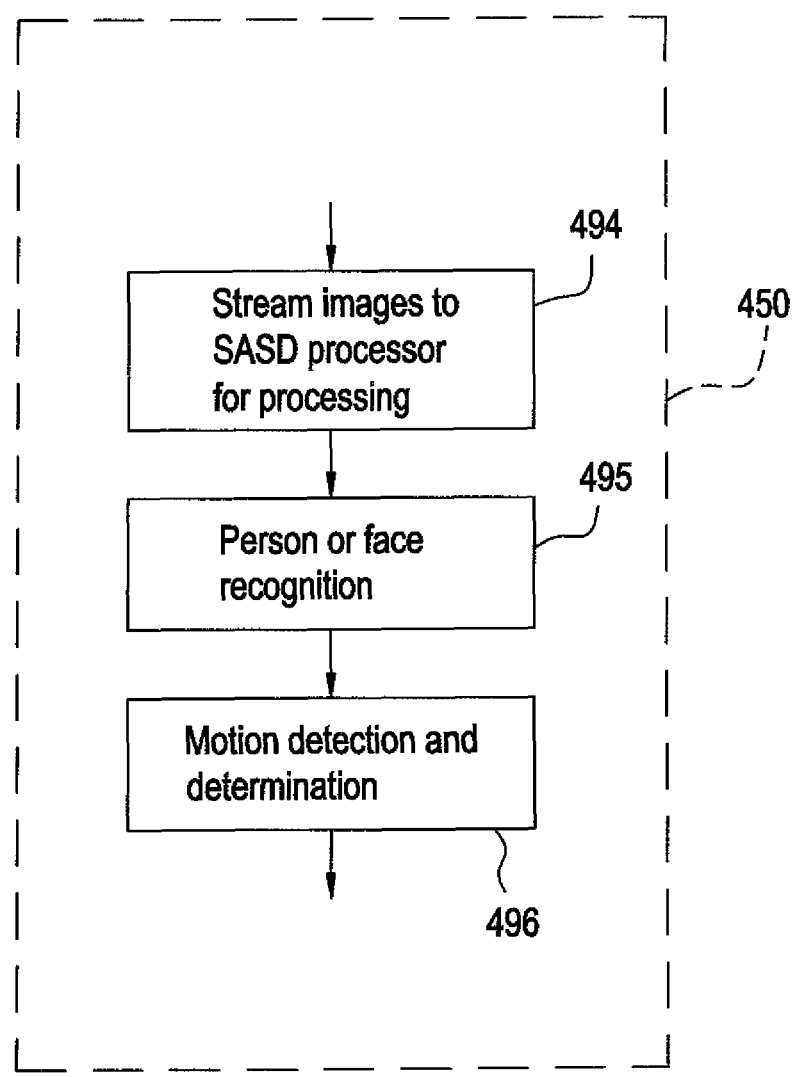
FIG. 5 is a flowchart of the optical software running on the UAV.

Referring now to the invention in more detail, in FIG. 5 there is shown further details of block 450 in FIG. 4. One of the functions is "follow me," which uses both the RF link and optical tracking to keep the UAV above and around the user. The RF link signal strength is used to keep the UAV within a certain radius of the user. SASD processor 290 communicates this signal strength to the UAV flight processor 250. As the signal strength drops the aerial device takes the appropriate action to raise the signal strength. This may be by a random search or coupled with the optical tracking. Other following techniques may also be applied, such as those in the AirDog product line (https://www.airdog.com).

Optical images are streamed to the SASD processor 290 as shown in block 494. The optical system can use a number of algorithms in block 495, including a CAMSHIFT algorithm, such as one described in "People Tracking via a Modified CAMSHIFT Algorithm," also incorporated herein. This in turn makes use of OpenCV, an open source computer vision library, also incorporated herein to supply an implementation of the Gaussian Mixture Model. There are many other ways to perform the same function, as is known in the art, including the use of facial recognition instead of people recognition. Facial recognition can be found in open CV, Facereclib (https://pypi.python.org/pypi/facereclib), http://www.face-rec.orgialgorithms/ and commercial facial recognition software (http://www.luxand.com/facesdk/). These functions can be used to keep the UAV near the user.

The results from block 495 are then processed in block 496 to detect the approach of people or assailants. This is used to detect potential threats as stated in block 450. This can be accomplished using an optical flow algorithm such as the Lucas-Kanade Algorithm. This algorithm is a widely used differential method for optical flow estimation, a version of which can be found in openCV. It assumes that the flow is essentially constant in a local neighborhood of the pixel under consideration, and solves the basic optical flow equations for all the pixels in that neighborhood using a least squares criterion. By combining information from several nearby pixels, the Lucas-Kanade method can often overcome vagaries of the optical flow equation. Other motion detection algorithms can be used, as is known in the art, such as found at http://blog.cedric.ws/opencv-simple-motion-detection. When a potential threat is noted, it is communicated to the user over the RF link. It can also trigger a warning light 120 or sound 130 from the PASD. The user can also enable light and sound over the RF link. Block 496 may also be used for collision avoidance and avoidance of capture with further manipulation of the camera images.

The light area function is used to provide a light 120 from above. It can also be part of the projector 125. The light 120 is activated in block 440 and can be controlled from the cellular phone. Some of the modes available include a random motion, diffuse lighting and lighting the path ahead. The light can be aimed mechanically or by using individual lights pointed in different directions. The light intensity can be turned up and directed at an assailant to temporary blind him, gaining time for the user to flee the area. If provided by projector 125, the light can also be steered by micro mirrors (Digital Light Processing). Additionally, if enabled, a map or directions or arrows indicating the nearest friend, police station or other public place of safety can be displayed on the ground to assist the user in finding a safe haven.

The spray 110 and/or Taser 140 functions are, where allowed bylaw, used for disabling an assailant. While these functions could be performed autonomously, the more likely scenario occurs when the user has determined with reasonable certainty that there is an assailant and needs to take protective measures. The phone could be used for initiating the release of noxious sprays or for firing stun gun darts and this can be done using controls in the SASD application or by issuing voice commands to the SASD, as is known in the art. The amount of spray and the charge available for stunning can be read back from the mounted/integrated SASD. The user could also be notified when to replace the noxious cartridge or recharge the battery.

The take off and land functions put the UAV into those respective modes. Take off causes the aerial device to assume its position overhead, as set by the other functions, e.g., "follow me." This can cause the aerial device to take off from a fixed location or to enable flight when it is tossed in the air, as is known in the art. Landing can be accomplished near the user using the optical data to prevent collision with the user or nearby objects.

Figure 6A:
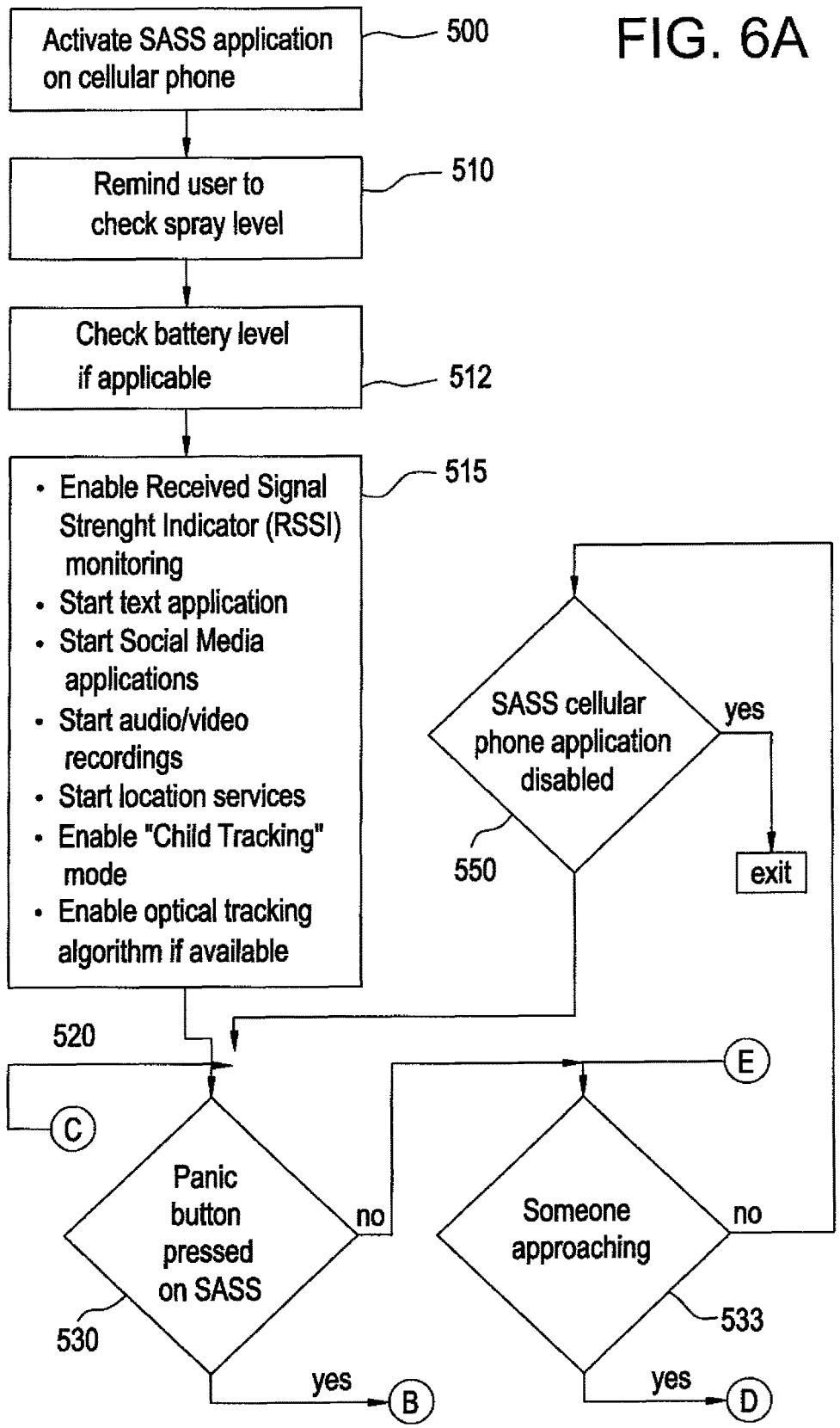
FIGS. 6A, 6B and 6C combine together as the circled "B" s, "C" s and "D" s to comprise a flowchart of the runtime software on the cellular phone.
Figure 6B:
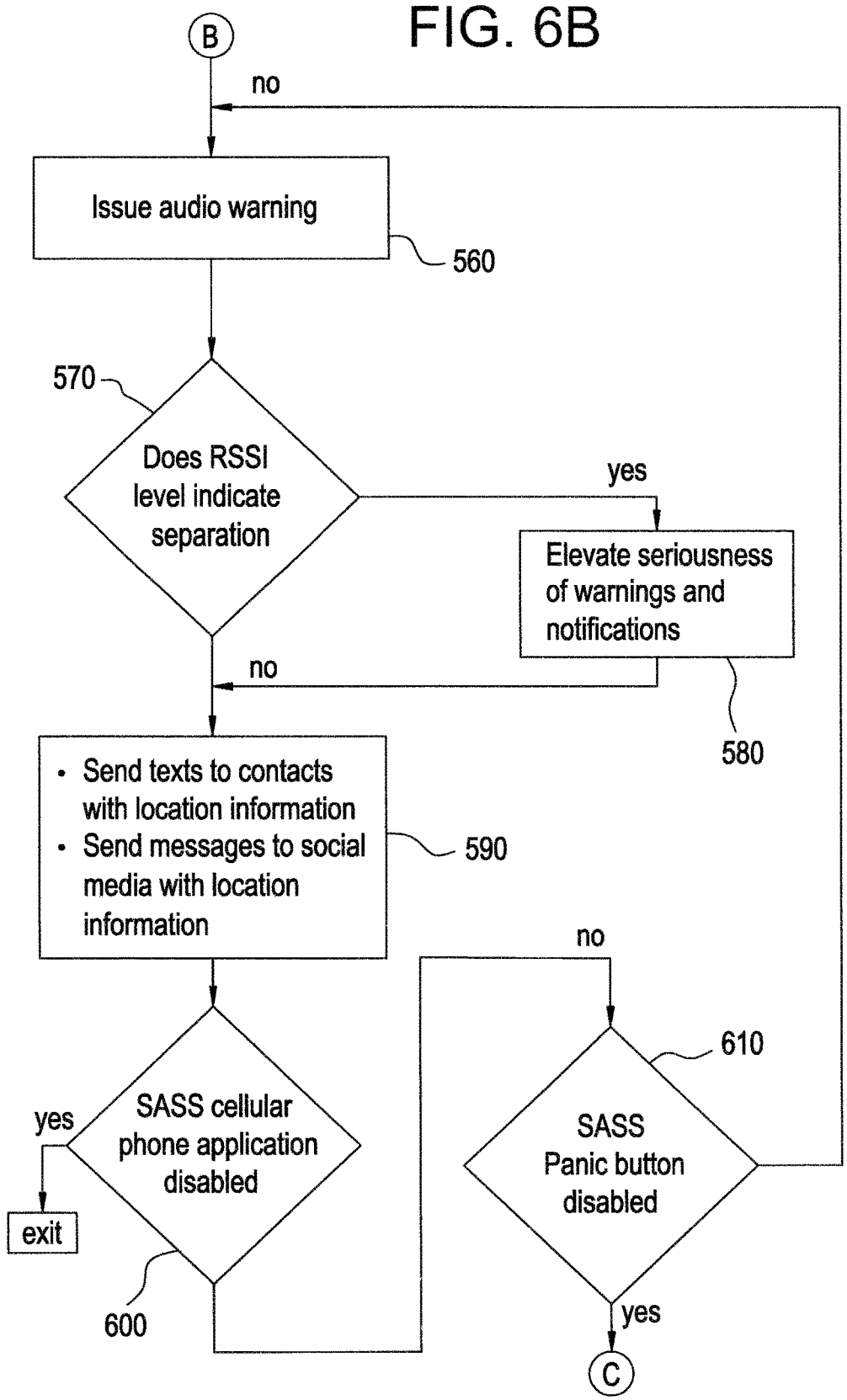
Figure 6C:
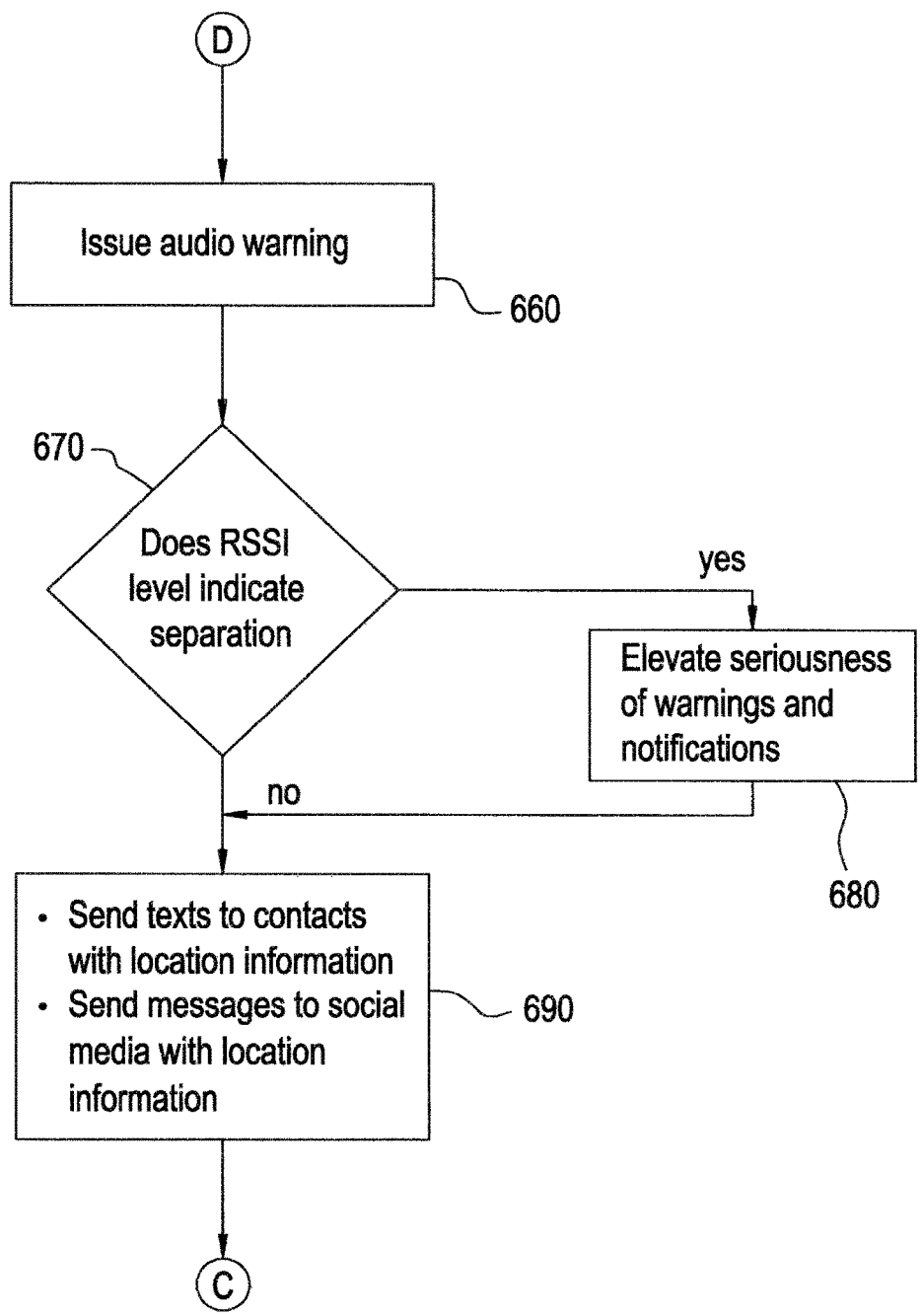

FIG. 6 consists of FIGS. 6A, 6B and 6C combined together at the circled "B"s, "C"s and "D"s to comprise a flowchart. Therein, additional details of the invention are shown in a flowchart of the software running on the cellular phone. Block 500 signifies that the user has enabled the SASS application. This can be performed in various user-friendly ways, including double tapping an icon, using speech recognition, etc. The first thing that happens upon startup is a reminder to the user to check the level of the irritant spray in Block 510. The user is then reminded, if required, to check battery charge in Block 512. Once the reminders are cleared, a number of actions occur in Block 515. This includes enabling the received signal strength indicator (used for separation determination in Block 570), starting the text application for contacting purposes, starting social media applications for constant contact updates, placing on standby audio and video recording applications, enabling locations services and/or child tracking and enabling the optical tracking algorithm that runs concurrently with the other PSS systems. After enabling these processes, a loop is entered where the panic button 120 is constantly monitored in Block 530 and rear assailant approach is noted in Block 533. Block 533 receives input from the assailant tracking algorithm described in FIG. 5, block 496. While in this loop, other actions are monitored. In Block 550, the state of the SASS is checked. If it is turned off the SASS applications are terminated. If not turned off, the loop is repeated.

However, if the panic button is pressed or activated by voice command in Block 530, or a potential assailant is approaching from behind in Block 533, a different set of actions is initiated. These actions form a loop that continues until the user decides that a threatening situation is over. In Block 560, the cellular phone and/or the SASD mounted or integrated with the UAV or in the docking station issues a loud audio warning to the perpetrator. If the warning is to be issued by the aerial SASD via block 130, the UAV will first descend to a low altitude for maximum effect. The warning can take the form of a brief announcement that events are being recorded; emergency personnel are being contacted, etc. The capturing and sending of the data cannot be reversed or canceled by the user or potential assailant. The perpetrator is notified using a pre-recorded message broadcast via a speaker built into cellular phone 2 speaker or from block 130 of the SASD that his data has been captured by the electronic device, thereby discouraging him from proceeding with the crime. Concurrently or sequentially, this warning may also be followed by a strobing or similarly intense flashing light from block 120 sufficiently powerful to illuminate the potential crime scene and the assailant. Next, in Block 570, a check is made concerning the received signal strength indicator (RSSI) level. If the level indicates separation (a weak signal indicates a larger than expected separation distance) between UAV and cell phone, as programmed in Block 375 for a specified time, an elevation of the threat assessment is made in Block 580. All information sent to contacts, social media, etc. in Block 590 are tagged to indicate that the threat has progressed to a more serious level. This can be done, as appropriate, with stressor words, numeric levels or color-coding. Block 600 checks if the cellular phone application is disabled or not. If so, the application exits. Otherwise Block 610 is executed to see if the panic button has been disabled. If so, control is returned to Block 530. Otherwise the loop is closed by returning to Block 560.

If someone is approaching from behind as discovered in Block 533, a different set of actions is initiated. These actions are part of the loop that continues until the user decides that a threatening situation is over. In Block 660, the cellular phone or the UAV SASD issues a loud audio warning to the user and possible assailant, indicating someone is approaching. This can take the form of a warning that events are being recorded; emergency personnel are being contacted, etc. The capturing and sending of the data cannot be reversed or canceled by the user or potential assailant. The assailant is notified using a pre-recorded message broadcast via built in cellular phone 2 speaker that his data has been captured by the electronic device, thereby discouraging him from proceeding with the crime. Concurrently or sequentially, this warning may also be followed by a strobing or similarly intense flashing light from block 120 sufficiently powerful to illuminate the potential crime scene and the assailant. Next, in Block 670, a check is made concerning the received signal strength indicator (RSSI) level. If the level indicates separation of the OSD (a weak signal indicates a larger than expected separation distance), as programmed in Block 375 for a specified time, an elevation of the threat assessment is made in Block 680. All information sent to contacts, social media, etc. in Block 690 are tagged to indicate that the threat has progressed to a more serious level. This can be done, as appropriate, with stressor words, numeric levels or color-coding. Block 700 (FIG. 7) checks if the cellular phone application is disabled or not. If so, the application exits. Otherwise the loop is closed by returning to Block 530.

Figure 7:
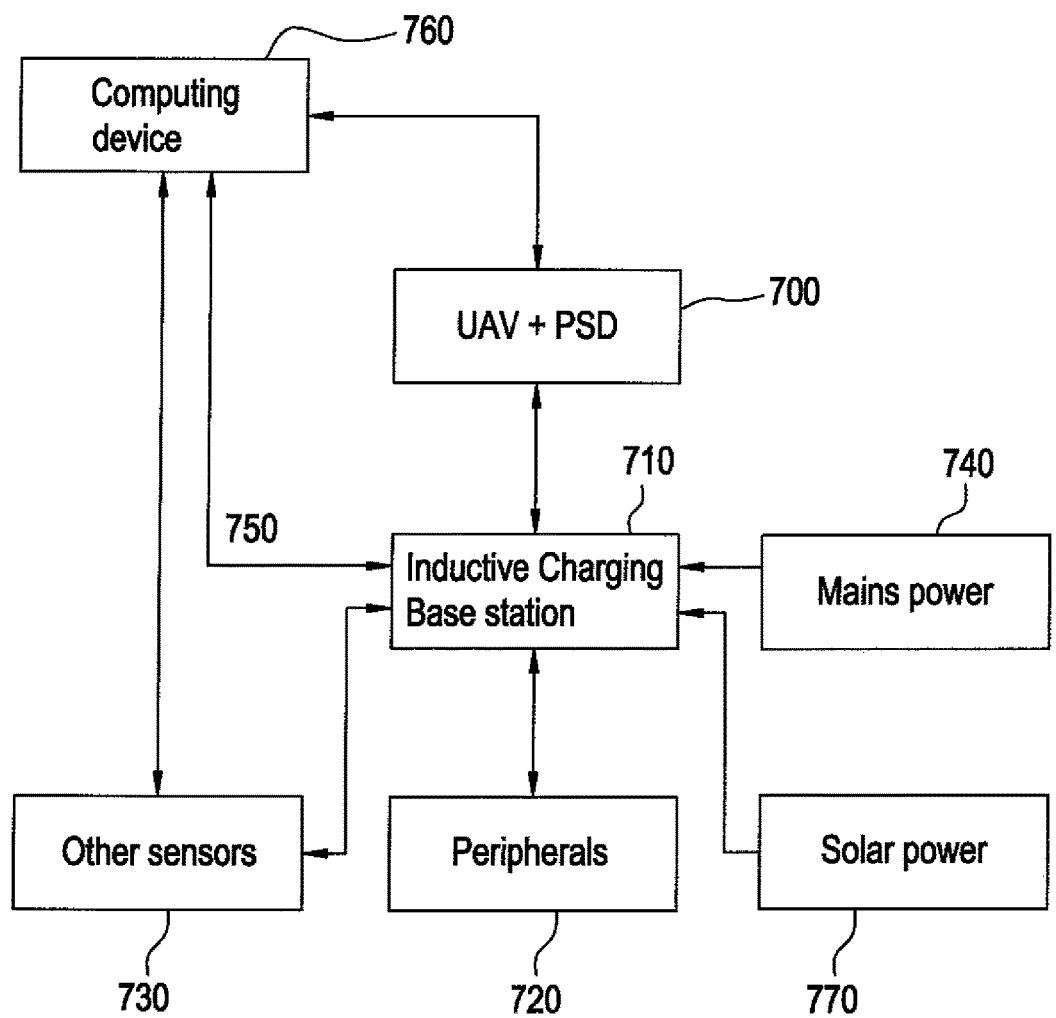
FIG. 7 is a block diagram of the inductive charging/base system and components.
Figure 10:
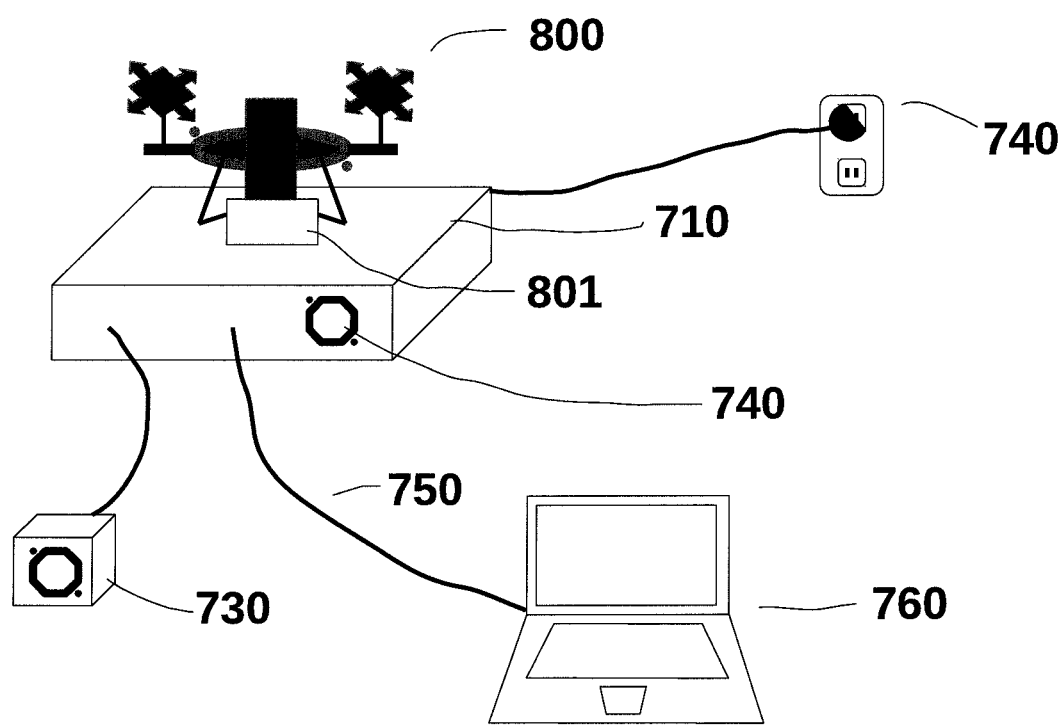
FIG. 10 shows a schematic representation of an embodiment employed for building security.

In a further embodiment, the mounted or integrated SASD on the UAV can perform as a home or building security system. Referring to FIGS. 7 and 10, block 700 represents the aforementioned SASD and UAV, block 1. This aerial device rests on an inductive charging/base, block 710. The housing 801 for the SASD is attached to the UAV 800. Block 710 provides a method of coupling to the battery of block 700 via block 210. This may be a mechanical or inductive coupling that allows the battery to be charged once the aerial device lands on the inductive charging/home base, similar to iRobot Roomba® docking and recharging, as is known in the art. Landing on the base 710 can be accomplished using the optical system of the SASD, coupled with the GPS and inertial functions of the UAV. Other beaconing could also be used for navigating the aerial device to the base. The base itself would typically be powered from the mains, block 740. The charging/home base can also contain additional peripherals, 720, such as ultrasonic motion detectors, thermal and glass breakage detectors, extra cameras, vibration sensors and other devices known in the art used for home and building security.

Block 730 represents other sensors that may already be present on the premises. These may be ultrasonic motion detectors, thermal detectors, additional cameras, vibration sensors, door and window sensors and other devices used for home and building security. These devices may be able to interface easily to the charging/home base station if they are coded in an open source manner. Alternatively, they may connect to computing device 760 via an appropriate interface, such as Bluetooth, USB or Ethernet.

Referring to FIG. 10, inductive charging/home base 710 is connected to a computing device 760 via an interface 750. Interface 750 may be wired or wireless, including USB, Ethernet and Bluetooth, or other custom, proprietary or open standard interface. Computing device 760 can be a mobile, wireless device, a desktop PC, a tablet, a notebook or any number of computing devices such as Raspberry Pi, Arduino, and other computing hardware. Computing device 760 may also connect to other sensors 730, such as ultrasonic motion detectors, thermal detectors, additional cameras, vibration sensors, door and window sensors and other devices known in the art over the appropriate interface. Software running on the computing device controls the other sensors 730 directly or indirectly through the charging/home base. It can also control the UAV and SASD 700 directly or through block 710. Examples of drone control can be found among the various drone manufacturers, for example Parrot (http://ardrone2.parrot.com/). Other peripherals 720 are controlled indirectly from computing device through inductive charging/home base 710. The computing device software will certainly contain much of the functionality of the cell phone application noted previously (FIGS. 3 and 5), plus allow for additional timing, arming, and disarming various sensors and peripherals. It will also be able to communicate to the outside world as the cell phone did, providing a means of contacting police, social media, etc.

One typical scenario for the SASD/UAV is with the inductive charging/home base as a fixed platform for mounted peripherals such as those in block 100. In addition, based on programming from the computing device 760 by the user, the SASD/UAV can make surveillance runs throughout the premises, flying a fixed, random or learned path as required. Navigation is again performed optically in conjunction with the IMU 9. Beacons for navigation could also be used as is known in the art. Other following techniques may also be applied, such as those in the AirDog product line (https://www.airdog.com). Multiple UAVs can be utilized to cover a larger volume or to take turns between battery charges. When the battery is low, the SASD/UAV will navigate to the inductive charging/home base station for charging, similar to robotic lawnmowers and vacuums.

Figure 8A:
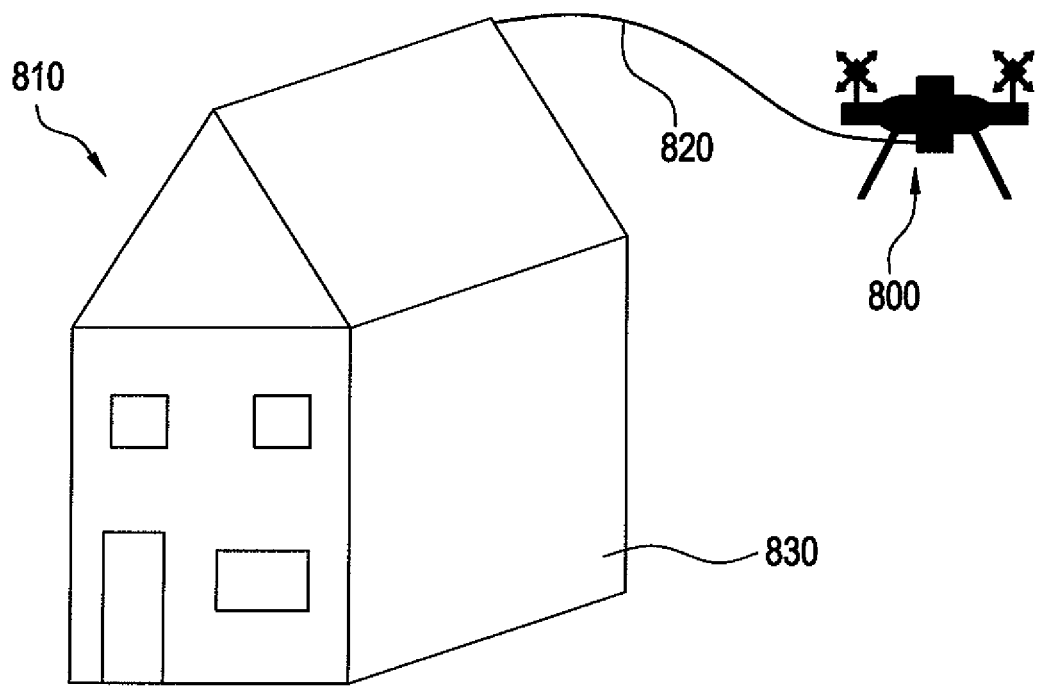
FIG. 8A shows a schematic representation of the SASD/UAV system tethered to a building using a physical cable.
Figure 8B:
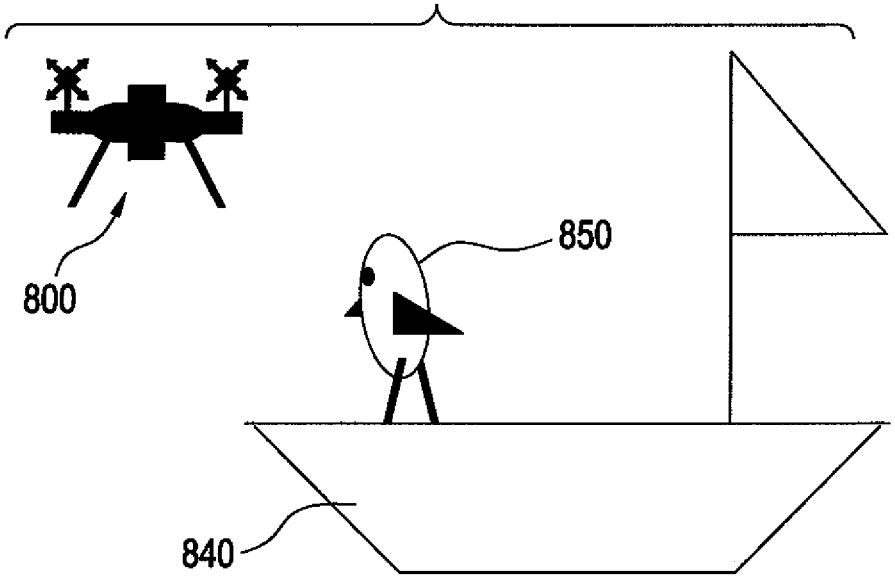
FIG. 8B shows the SASD/UAV system being used to deter wildlife from a premises, for example, a boat.

In a further embodiment, the SASD/UAV can be tethered to a building using a physical cable, as shown in FIG. 8*a*. UAV 800 communicates and is powered over tether 820, which is attached to residence 810. The tether connects to a base station, or other computing device that provides the same functions as the cellular phone. Residence 810 can have a sheltered landing zoned for protecting the UAV when not in use. The UAV 800 can provide videos of the premises, searching for vandals who might "tag" (block 830) the building, or burglars. When found, the same defensive devices noted previously such as spray 110, light 120, sound 130 and Taser 150 can be used to dissuade an assailant or vandal. FIG. 8B shows the SASD being used to deter wildlife from a premises, in this case boat 840. The SASD/UAV 800 has a base station on boat 840 or on a nearby dock. The SASS system is programmed to detect bird 850 on boat 840 using its camera and possibly other sensors on boat 840. The SASD/UAV is programmed to scare the bird 850 away by using its light 120, projector 125 and sound 130 and also by flying towards the bird 850. This could be performed in a mechanically or RF tethered mode.

Figure 9:
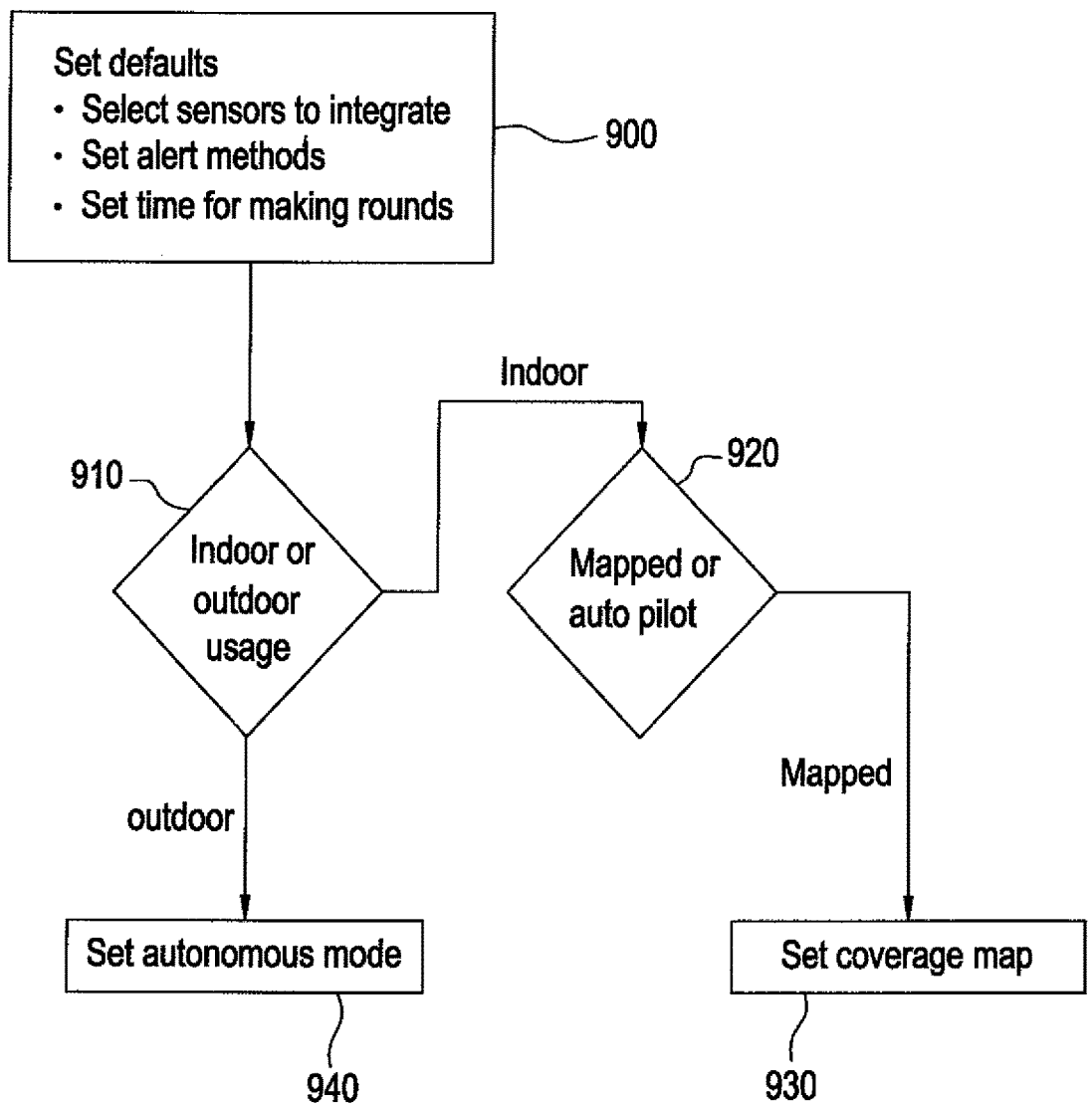
FIG. 9 shows details of a software interface for premises protection.

FIG. 9 details the software interface for premise protection. Block 900 is the setup portion of the control software running on a PC. The user would set defaults, such as which additional sensors should be used with the system, how they should be communicated with, alert methods such as email or text, and time to perform rounds, etc. Depending on the premises, the user would select whether the system is mechanically or RF tethered in block 910. If indoors and RF tethered, the user is asked whether the SASD/UAV should follow a predefined path or fly autonomously around the base station in block 920. If a predefined path is selected, the SASD/UAV is taught the path in block 930 by placing it in a mapping mode and walking it along the desired path. In either case, the UAV sensors are used to prevent collisions with objects and for navigation. If outdoor, then the user selects how the SASD/UAV should behave. If frightening birds, the SASD/UAV would try to scare the birds. If protecting against vandals and burglars the SASD/UAV would be set to observe, capture data, and report.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but solely by the terms of the appended claims.

The invention claimed is:

1. A safety and security device on an aerial platform, comprising:
   a) a self-contained aerial-capable safety device having a housing and including at least one self-defense mechanism;
   b) said aerial-capable safety device including a transmitter for wirelessly transmitting signals to a cellular telephone carried by a user and programmed with software facilitating operation of said safety and security device;
   c) said transmitter being activated through operation of said software to transmit said signals to said cellular telephone responsive to either (i) activation of said at least one self-defense mechanism responsive to a sensed threat, or (ii) manual activation of said at least one self-defense mechanism by said user;
   d) said signals informing said cellular telephone that a user of said safety and security device requires assistance;
   e) said device including a "follow me" function that recognizes said user and tracks position of said user, and, responsive thereto, causes said aerial platform to move to stay in proximity with said user;
   f) said device further including an optical safety device including an optical sensor for detecting proximity of a potential assailant; and wherein responsive to said optical sensor on the aerial platform detecting proximity of a potential assailant, said transmitter is activated to wirelessly transmit signals to said cellular telephone notifying of need for assistance; and
   g) a light controllable by said cellular telephone and movable to illuminate said potential assailant.

2. The device of claim 1, wherein said at least one self-defense mechanism is chosen from the group consisting of a noxious spray, a stunning device, a projectile firing, and an energy release weapon.

3. The device of claim 2, wherein said stunning device comprises a battery-powered stun gun incorporated into said housing.

4. The device of claim 1, wherein said transmitter incorporates digital data link technology.

5. The device of claim 1, wherein at least one self-defense mechanism includes a projectile firing or energy release weapon.

6. The device of claim 1, wherein said safety device includes a separation sensor and alarm which senses separation distance from said cellular telephone and activates an alarm when said distance exceeds a pre-set threshold, said separation distance being determined by measuring signal strength.

7. The device of claim 1, further including a global positioning system (GPS) in said safety device that sends signals to said cellular telephone as to the physical location of said safety device.

8. The device of claim 2, wherein said noxious spray comprises pepper spray, said personal safety device including a monitor of remaining volume of pepper spray within a reservoir contained within said housing.

9. The device of claim 1, wherein said safety device is battery powered.

10. The device of claim 1, further including a speaker and a pre-recorded warning message that may be activated and broadcast via said speaker.

11. The device of claim 1, further wherein said light may flash and is sufficiently powerful enough to illuminate a potential crime scene and an assailant from said aerial platform.

12. The device of claim 1, wherein said safety device is flying or hovering within a building, and wherein responsive to said optical sensor detecting proximity of a potential assailant, said transmitter is activated to wirelessly transmit signals to said cellular telephone notifying of need for assistance.

13. A personal safety device mounted on an unmanned aerial vehicle (UAV) and removably placed in a docking and inductive charging station located within a premises, comprising:
   a) a self-contained personal safety device having a housing and including at least one self-defense mechanism;
   b) said personal safety device including a transmitter for wirelessly transmitting signals to a cellular telephone and said cellular telephone is programmed with software facilitating operation of said safety and security device;
   c) said transmitter being activated through operation of said software to transmit signals to said cellular telephone responsive to either (i) activation of said at least one self-defense mechanism responsive to a sensed threat, or (ii) manual activation of said at least one self-defense mechanism by said user;
   d) said signals informing said cellular telephone that a user of said personal safety device requires assistance; and
   e) said UAV and device flying away from said docking and inductive charging station to conduct surveillance of said premises.

14. The device of claim 13, wherein said at least one self-defense mechanism is chosen from the group consisting of a noxious spray, a stunning device, a projectile firing, and an energy release weapon.

15. The device of claim 14, wherein said stunning device comprises a battery-powered stun gun incorporated into said housing.

16. The device of claim 14, wherein said transmitter incorporates digital data link technology.

17. The device of claim 14, wherein said personal safety device includes a separation sensor and alarm which senses separation distance from said cellular telephone, and activates said alarm when said distance exceeds a pre-set threshold, said separation distance being determined by measuring signal strength.

18. The device of claim 14, further including a global positioning system (GPS) in said personal safety device that sends signals to said cellular telephone as to physical location of said personal safety device.

19. The device of claim 14, wherein said noxious spray comprises pepper spray, said personal safety device including a monitor of remaining volume of pepper spray within a reservoir contained within said housing.

20. The device of claim 13, further including an optical safety device with an optical sensor for detecting proximity of a potential assailant.

21. The device of claim 20, wherein responsive to said optical sensor detecting proximity of a potential assailant, said transmitter is activated to wirelessly transmit such data to said cellular phone.

22. The device of claim 13, further including a flashing light sufficiently powerful enough to illuminate a potential crime scene and an assailant from a docking mechanism or a building.

23. An aerial personal safety device system, comprising:
   a) a self-contained battery powered aerial personal safety device having a housing and including at least one self-defense mechanism chosen from the group consisting of a noxious spray, a projectile weapon, energy release weapon, and a stunning device, said system including an aerial platform on which said device is mounted;
   b) said personal safety device including a transmitter for wirelessly transmitting signals to a cellular telephone carried by a user and programmed with software facilitating operation of said safety and security device;
   c) said transmitter being activated through operation of said software to transmit signals to said cellular telephone responsive to either (i) activation of said at least one self-defense mechanism responsive to a sensed threat, or (ii) manual activation of said at least one self-defense mechanism by said user;
   d) said signals informing said cellular telephone that said user of said aerial personal safety device requires assistance;
   e) said aerial personal safety device including a separation sensor and alarm, wherein said separation sensor senses separation distance from said cellular telephone and activates an alarm when said distance exceeds a pre-set threshold, said distance being determined by measuring signal strength;
   f) said device including a "follow me" function that recognizes said user and tracks position of said user, and, responsive thereto, causes said aerial platform to move to stay in proximity with said user;
   g) said device further including an optical safety device including an optical sensor for detecting proximity of a potential assailant and wherein responsive to said optical sensor on the aerial platform detecting proximity of a potential assailant, said transmitter is activated to wirelessly transmit signals to said cellular telephone notifying of need for assistance.

24. The system of claim 23, wherein said noxious spray comprises pepper spray and said stunning device comprises a battery-powered stun gun incorporated into said housing.

25. The system of claim 23, further including a global positioning system (GPS) in said aerial personal safety device that sends signals to said cellular telephone as to physical location of said personal safety device.

26. The system of claim 23, further including a flashing light sufficiently powerful enough to illuminate a potential crime scene and an assailant from said aerial platform either outside or within a building, whether stationary, hovering or flying.

27. The system of claim 20, wherein responsive to said optical sensor detecting proximity of a potential assailant, said transmitter is activated to wirelessly transmit signals to said cellular telephone notifying of need for assistance.

28. A safety and security device in a docking and inductive charging station, comprising:
   a) a self-contained safety and security device having a housing and including at least one self-defense mechanism;
   b) said device including a transmitter for wirelessly transmitting signals to a cellular telephone and said cellular telephone being programmed with software facilitating operation of said safety and security device;
   c) said transmitter being activated through operation of said software to transmit signals to said cellular telephone responsive to either (i) activation of said at least one self-defense mechanism responsive to a sensed threat, or (ii) manual activation of said at least one self-defense mechanism by said user;
   d) said signals informing said cellular telephone that the device has launched to monitor and deter nuisance wildlife or vandals from defacing, damaging or destroying public or private property;
   e) said device having been installed on a convenient platform on the private property to be protected and including a automated mechanism for detecting a threat to said private property, f) said device including a UAV with one or more defensive measures to deter the threat, scare off wildlife, and, where appropriate, identify a perpetrator while communicating its activation and purpose to said cellular telephone before returning to its docking station.

* * * * *